United States Patent [19]

Colonius et al.

[11] Patent Number: 4,519,125

[45] Date of Patent: May 28, 1985

[54] SUCKER ROD COUPLING MANUFACTURING SYSTEM

[75] Inventors: Ray E. Colonius, Bloomfield Hills; Edward Early, Romeo, both of Mich.

[73] Assignee: Cargill Detroit Corp., Clawson, Mich.

[21] Appl. No.: 561,660

[22] Filed: Dec. 15, 1983

Related U.S. Application Data

[63] Continuation of Ser. No. 323,967, Nov. 23, 1981, abandoned.

[51] Int. Cl.³ .............................................. B23P 13/00
[52] U.S. Cl. .................................... 29/558; 29/33 T; 29/557
[58] Field of Search ...................... 29/33 R, 33 T, 563, 29/564, 557, 558, 33 D; 408/1, 80, 82; 285/390, 355, DIG. 17

[56] References Cited

U.S. PATENT DOCUMENTS

| Re. 24,441 | 3/1958 | Parker et al. | 408/1 |
| 1,703,232 | 2/1929 | Gray et al. | 29/557 |
| 2,747,948 | 5/1956 | Jergens | 408/82 X |
| 2,862,215 | 12/1958 | Gross | 285/390 X |
| 3,258,838 | 1/1966 | Tilton, Jr. | 29/558 X |
| 3,981,210 | 9/1976 | Janiszewski | 408/82 X |

Primary Examiner—William R. Briggs

[57] ABSTRACT

A sucker rod coupling manufacturing system providing precision squareness of ends with through rolled thread axis characterized by O. D. clamping of the workpiece coupling at all machining operations involving the critical relationship of square shoulders to thread axis and through piloted boring of I. D. to be roll threaded.

16 Claims, 6 Drawing Figures

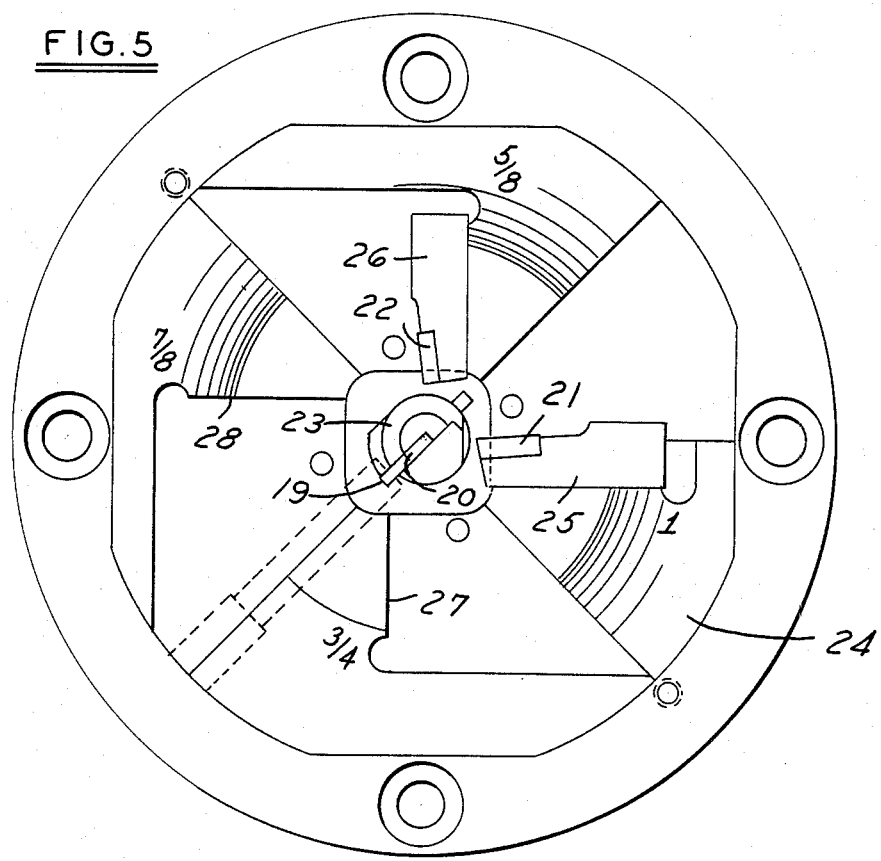
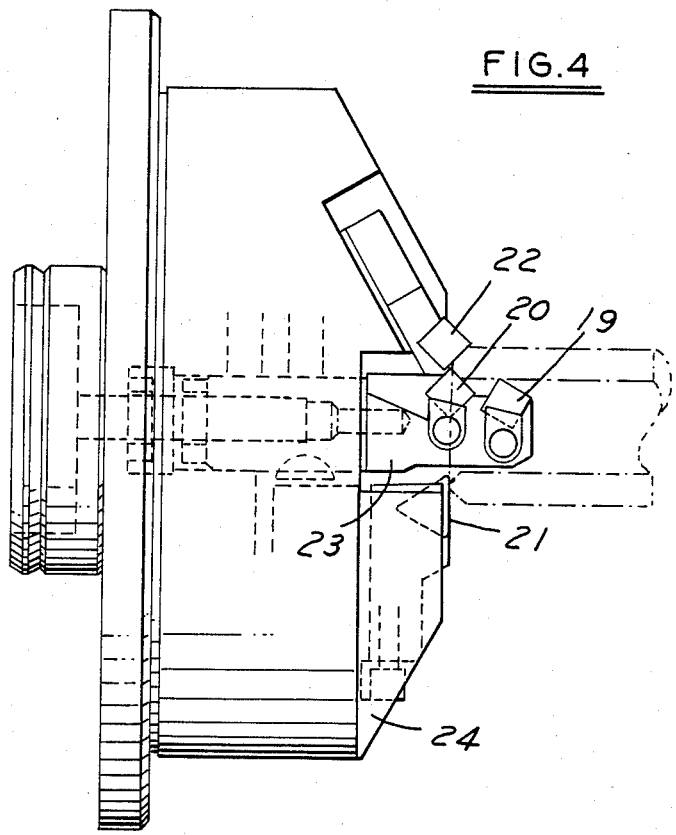

SUCKER ROD COUPLING MANUFACTURING SYSTEM

This application is a continuation of application Ser. No. 323,967 filed on Nov. 23, 1981 for Sucker Rod Coupling Manufacturing System now abandoned.

BACKGROUND OF THE INVENTION

Conventional practice for machining sucker rod couplings involves bar machines wherein barstock prior to cutoff is rotated relative to fixed tooling for performing partial inner surface machining operations as well as any O.D. machining followed by completion of interior machining operations including thread forming after cutoff with final grinding of the coupling ends performed with the coupling mounted on a threaded arbor.

When such barstock operations are performed starting with solid barstock or tubing, drilling or boring part way through from one end prior to cutoff with completion of drilling or boring from the other end following cutoff, misalignment of the holes may result. In addition finish grinding of the ends to square in relation to a threaded arbor comprises an unnecessary extra operation relative to the method of the present invention.

SUMMARY OF THE PRESENT INVENTION

Four types of bar material may be involved in the manufacture of sucker rod couplings; namely, solid barstock with the O.D. oversize, or correct size, or tubular barstock with the O.D. oversize, or correct size. In whatever form of starting bar material may be involved the first operation of the present method is to cutoff the coupling length including end finishing stock. Sequential operations as required bring any of the forms of bar material to a common condition of correct size finished O.D., including the provision of milled wrench flats on both sides when required, and a concentric unfinished I.D. From this point on remaining operations take place at a series of stations in each of which the coupling workpiece is held on the finished O.D. surface. In the first station both ends are counterbored, faced and chamfered with aligned rotatable tooling entering simultaneously from both ends. Each tooling head carries four indexable carbide inserts for machining the counterbore, inner chamfer, outer chamfer and end face in a single pass; in the next station the I.D. is bored through with an end piloted boring bar having two indexable carbide inserts to an appropriate size for roll forming the thread; and in the next station a roll form self-centering tap is fed through. These processing operations assure precision concentricity with the O.D. and squareness of the faced ends in relation to the thread axis thereby avoiding any necessity for final end face grinding on a threaded arbor as in conventional practice. Coupling production rates of 250/hour have been achieved through the use of this manufacturing system compared to a maximum of 125/hour using conventional bar machine methods.

BRIEF DESCRIPTION OF THE DRAWINGS

FIG. 4 is a side elevation of a counterbore, chamfer and end facing head used in machining the coupling ends;

FIG. 5 is a face view of the machining head illustrated in FIG. 4; and

DETAILED DESCRIPTION OF THE PRESENT MANUFACTURING METHOD

Figure 2:
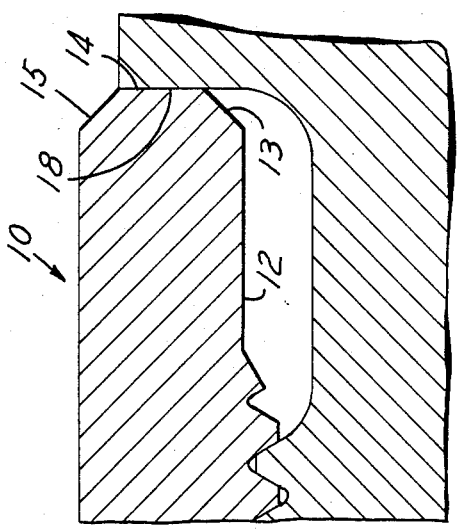
FIG. 2 is an enlarged fragmentary sectional view illustrating the thread engagement of sucker rod and coupling.
Figure 1:
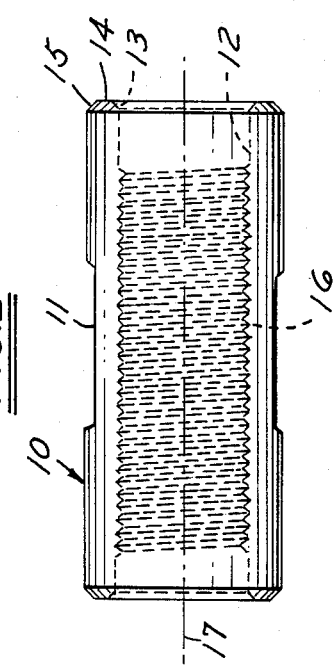
FIG. 1 is a sectional view of a finished sucker rod coupling.

With reference to FIG. 1 the respective surfaces involved in the sucker rod coupling include O.D. 10, flats 11, counterbore 12, inner chamfer 13, end face 14, outer chamfer 15 and internal rolled thread 16. The most critical relationship in the manufacture of the coupling is squareness of ends 14 with thread axis 17 which, as illustrated in FIG. 2, will result in full engagement of coupling end 14 with the sucker rod shoulder 18.

Figure 3:
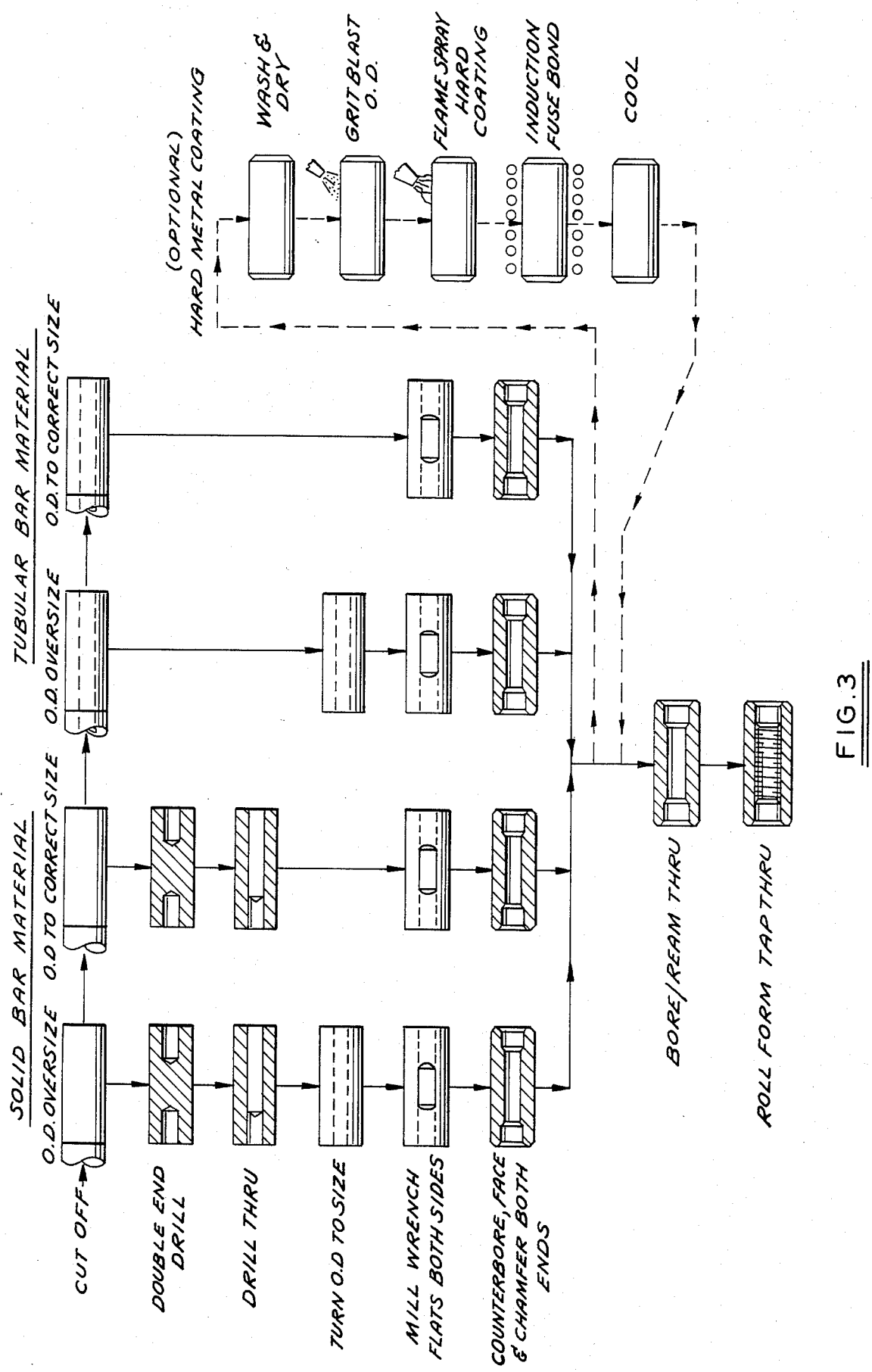
FIG. 3 is a schematic chart illustrating the respective sequence of operation for each of four different coupling materials.

With reference to FIG. 3 preliminary operations for solid barstock with oversized O.D. include (1) cutoff, (2) double end drill, (3) drill through, and (4) turn O.D. to size. The last operation (4) is omitted where the solid bar material is supplied with O.D. to correct size. With reference to tubular bar material having O.D. oversize preliminary (2) double end drill and (3) drill through operations are omitted; and when the tubular bar material is furnished with O.D. to correct size, the (4) O.D. turning operation is likewise omitted.

Where required in the finished product, the next operation for all bar materials is to mill wrench flats on both sides and remaining operations for all starting materials are likewise the same.

With either conveyor or inclined chute feed from previous operations, the coupling is next inserted, preferably automatically by an elevating piston between clamping jaws fed by reverse screws to engage, center and rigidly hold the coupling between opposed horizontal axis machining heads, such as the one illustrated in FIG. 4, adapted to simultaneously process both ends with counterbore, face and chamfer operations during a single rotary simultaneous in-feed of the machining heads. As illustrated in FIG. 4 each machining head includes four indexable tungsten carbide cutter inserts 19, 20, 21 and 22 for machining respectively counterbore 12, inner chamfer 13, end face 14 and outer chamfer 15. Inserts 19, 20 are mounted on plug 23 which fits within machining head body 24 and is replaced for different size internal diameter couplings. Facing insert 21 is mounted on cartridge 25 common to all part sizes, and insert 22 on cartridge 26 illustrated in FIG. 5 for ⅝ nominal coupling size. Alternative mounting pads 27 and 28 are provided for alternative ¾ and ⅞" nominal coupling size cartridges. It will be understood that the cartridges shown in FIG. 4 are rotated from their actual radial planes as shown in FIG. 5 in order to illustrate relative cutting positions in a single view.

Figure 6:
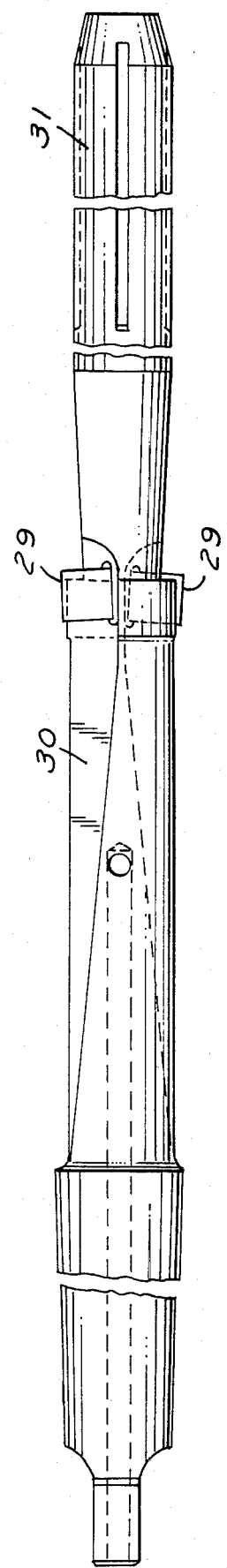
FIG. 6 is a side elevation of a boring tool used in boring the final diameter for the roll threading operation.

With reference to FIG. 6 two diametrically opposite carbide cutters 29 are mounted in boring bar 30 having pilot extension 31 which enters a rotary guide bushing at the boring station for accurately stabilizing the through boring operation.

At the next station the roll forming tap is fed through the coupling, again held between V-jaws on its O.D. In this case the roll forming tool floats to accurately follow the bored hole without pilot thus completing the manufacturing operations rather than for roll stamp marking and phosphate coating.

Optionally, the final operations may include electroetch marking, centerless grinding, and double end grinding although the latter grinding operations are not required to meet API standards for dimensional tolerances. As another alternative for couplings particularly adapted for use in certain oil wells where hard metal outer coating is desired, optional wash and dry, grit blast O.D., flame spray hard coating, induction fuse bonding, and cooling operations may be interposed between the finish boring operation.

In summary, clamping the coupling between opposed machining heads which simultaneously counterbore, face and chamfer both ends of the coupling, followed by piloted boring with a double insert boring bar at a station where the coupling is again clamped on the same O.D. used for the previous facing operation, assures precise squareness of face with the axis of the bored hole and the roll formed thread so that no finish grinding of the ends with the coupling mounted on a threaded arbor is required.

We claim:

1. Production method for manufacturing sucker rod couplings comprising the steps of
    clamping the finished O.D. of a tubular workpiece cut to length with finishing end stock at a coupling end machining station,
    counterboring, facing and chamfering each coupling end while the coupling is clamped on the finished O.D.,
    reclamping said finished O.D. at a boring station,
    through boring the tubular I.D. at said boring station,
    using a pilot extension on a boring bar engageable with a pilot guide means at said boring station,
    reclamping said finished O.D. at a threading station,
    and roll threading said I.D. through said coupling.

2. The production method of claim 1 including the use of two axially aligned four cutter tool heads at said machining station.

3. The production method of claim 2 including the use of replaceable insert cutters in each of said tool heads.

4. The production method of claim 2 including the use of indexable replaceable cutter inserts in each of said tool heads.

5. The production method of claim 2, 3 or 4 including the provision for alternative size couplings in each of said tool heads.

6. The production method of claim 1 including the use of a boring bar having two diametrically opposed cutters.

7. The production method of claim 6 including the use of replaceable insert cutters.

8. The production method of claim 6 including the use of indexable replaceable insert cutters.

9. The production method of claim 1, 6, 7 or 8 including the use of a pilot extension on said boring bar engageable with a fixed pilot bore at said boring station.

10. The production method of claim 1 including the use of a floating thread rolling tool at said threading station.

11. The production method of claim 1, 2, 6 or 10 for manufacturing sucker rod couplings from oversized O.D. solid barstock including preliminary steps of
    cutoff to said length,
    clamping the oversize O.D. at a drilling station,
    simultaneously double end drilling part way through,
    reclamping at a further drill station,
    completing the drilling through from one end,
    and turning the O.D. to size.

12. The production method of claim 1 including hard metal coating operations added to said finished O.D. comprising washing and drying the workpiece, grit blasting the O.D. of the workpiece, flame spray hard coating the O.D. of the workpiece, induction fuse bonding the hard coating, and cooling the workpiece, said operations interposed before said through boring operation.

13. The production method of claim 1 including supplemental operations after roll threading said I.D. comprising centerline grinding the O.D. of the workpiece, and double end grinding the workpiece.

14. The production method of claim 1, 2, 6 or 10 for manufacturing sucker rod couplings from solid bar material having correct size O.D. including preliminary steps of
    cut off to said length,
    clamping the O.D. at a drilling station,
    simultaneously double end drilling part way through,
    reclamping at a further drilling station,
    and completing the drilling through from one end.

15. The production method of claim 1, 2, 6 or 10 for manufacturing sucker rod couplings from tubular bar material having oversize O.D. including preliminary steps of
    cut off to said length,
    and turning the O.D. to size.

16. Production method for manufacturing sucker rod couplings comprising the steps of
    clamping the finished O.D. of a tubular workpiece cut to length with finishing end stock at a coupling end machining station,
    simultaneously counterboring facing and chamfering both coupling ends at said station,
    reclamping said finished O.D. at a boring station,
    through boring the tubular I.D. at said boring station using a pilot extension on a boring bar engageable with a rotary guide bushing at said boring station,
    reclamping said finished O.D. at a threading station,
    and roll threading said I.D. through said coupling.

* * * * *